United States Patent
Motooka et al.

(10) Patent No.: US 10,168,226 B2
(45) Date of Patent: Jan. 1, 2019

(54) TEMPERATURE SENSOR

(71) Applicant: Panasonic Intellectual Property Management Co., Ltd., Osaka (JP)

(72) Inventors: Toshiya Motooka, Nara (JP); Hiroshi Shigemura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 146 days.

(21) Appl. No.: 15/319,062

(22) PCT Filed: Apr. 13, 2015

(86) PCT No.: PCT/JP2015/002048
§ 371 (c)(1),
(2) Date: Dec. 15, 2016

(87) PCT Pub. No.: WO2016/017050
PCT Pub. Date: Feb. 4, 2016

(65) Prior Publication Data
US 2017/0122814 A1    May 4, 2017

(30) Foreign Application Priority Data

Jul. 28, 2014 (JP) .................. 2014-152549

(51) Int. Cl.
*G01K 7/00* (2006.01)
*G01K 1/14* (2006.01)
(Continued)

(52) U.S. Cl.
CPC ............ *G01K 1/14* (2013.01); *G01K 7/22* (2013.01); *G01K 13/02* (2013.01); *G01K 2013/026* (2013.01)

(58) Field of Classification Search
USPC ........................ 374/163, 208, 148
See application file for complete search history.

(56) References Cited

U.S. PATENT DOCUMENTS 3,890,588 A * 6/1975 Kanaya .................. G01K 1/08
338/22 R
5,749,656 A * 5/1998 Boehm .................. G01K 7/22
338/28
(Continued)

FOREIGN PATENT DOCUMENTS

JP      61-197809 A      9/1986
JP    H10-300589 A    11/1998
(Continued)

OTHER PUBLICATIONS

International Search Report issued in Application No. PCT/JP2015/002048 dated Jun. 2, 2015, with English translation.

*Primary Examiner* — Mirellys Jagan
(74) *Attorney, Agent, or Firm* — McDermott Will & Emery LLP (57) ABSTRACT

The present invention is a temperature sensor that is inserted into a screw hole of a container to be detected. The temperature sensor includes a bottomed cylindrical metal case having an opening part, a temperature-sensitive element disposed inside the opening part, a terminal in which lower end thereof is connected to the temperature-sensitive element and an upper end thereof is led out outward, and a resin coupler that seals the opening part. The terminal is led out from the resin coupler. The metal case includes a lower part disposed with the temperature-sensitive element, a screw part that is provided above the lower part and is engaged with the screw hole, and a large diameter part that is provided above the screw part and has a larger diameter than a diameter of the screw part. Further, an outer circumference of the large diameter part is covered with a resin layer.

11 Claims, 6 Drawing Sheets

(51) Int. Cl.
*G01K 7/22* (2006.01)
*G01K 13/02* (2006.01)

(56) References Cited

U.S. PATENT DOCUMENTS

| | | | | |
|---|---|---|---|---|
| 8,029,188 B2* | 10/2011 | Park | ........................ | G01K 13/02 338/22 R |
| 2003/0058920 A1* | 3/2003 | Lyle | ......................... | G01K 1/16 374/185 |
| 2003/0147452 A1* | 8/2003 | Adachi | .................. | G01K 13/02 374/185 |
| 2005/0185696 A1* | 8/2005 | Nakabayashi | ......... | G01K 13/02 374/145 |

FOREIGN PATENT DOCUMENTS

| | | | |
|---|---|---|---|
| JP | 2002-013987 A | 1/2002 | |
| JP | 2002-022555 A | 1/2002 | |

* cited by examiner

TEMPERATURE SENSOR

RELATED APPLICATIONS

This application is the U.S. National Phase under 35 U.S.C. § 371 of International Application No. PCT/JP2015/002048, filed on Apr. 13, 2015, which in turn claims the benefit of Japanese Application No. 2014-152549, filed on Jul. 28, 2014, the disclosures of which are incorporated by reference herein.

TECHNICAL FIELD

The present invention relates to a temperature sensor disposed with a temperature-sensitive element inside a metal case of the temperature sensor.

BACKGROUND ART

Figure 6:
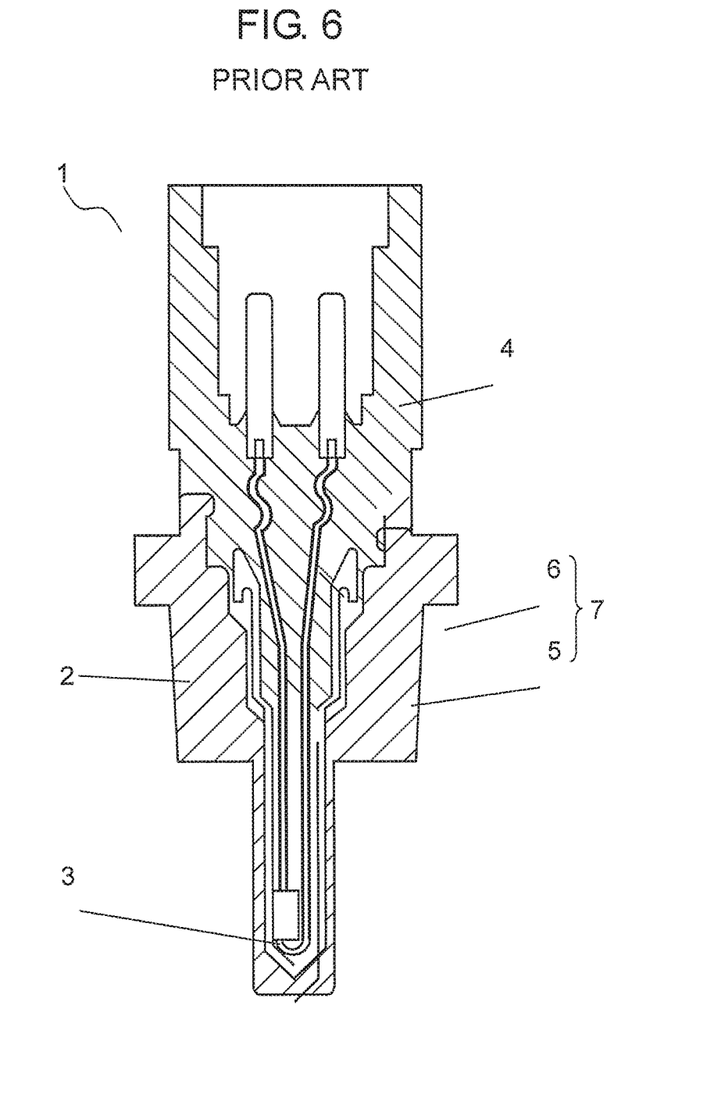
FIG. 6 is a cross-sectional view of a conventional temperature sensor.

In temperature sensor 1 illustrated in FIG. 6, temperature-sensitive element 3 is disposed inside bottomed cylindrical case 2 and is sealed with coupler 4. Bolt part 7 that includes screw part 5 and bolt head part 6 and is used when temperature sensor 1 is externally installed is provided in case 2. In other words, when a material of case 2 is metal, bolt part 7 is also formed of the same metal, and when the material of case 2 is resin, bolt part 7 is also formed of the same resin.

Here, when a target of temperature detection is liquid such as an engine oil, shielding performance of the liquid must be secured. Therefore, a metallic material such as a copper material or a steel material is used as the material of case 2.

For example, PTL 1 and PTL 2 are known as prior art document information associated with the present invention.

CITATION LIST

Patent Literature

PTL 1: Unexamined Japanese Patent Publication No. 2002-22555

PTL 2: Unexamined Japanese Patent Publication No. H10-300589

SUMMARY OF THE INVENTION

A temperature sensor of the present invention is a temperature sensor that is inserted into a screw hole of a container to be detected. The temperature sensor includes a bottomed cylindrical metal case having an opening part, a temperature-sensitive element disposed inside the opening part, a terminal in which lower end thereof is connected to the temperature-sensitive element and an upper end thereof is led out outward, and a resin coupler that seals the opening part. The terminal is led out from the resin coupler. The metal case includes a lower part disposed with the temperature-sensitive element, a screw part that is provided above the lower part and is engaged with the screw hole, and a large diameter part that is provided above the screw part and has a larger diameter than a diameter of the screw part. Further, an outer circumference of the large diameter part is covered with a resin layer.

This configuration improves detection responsiveness and detection accuracy of a miniaturized temperature sensor.

DESCRIPTION OF EMBODIMENTS

Prior to a description of exemplary embodiments, a problem of conventional temperature sensor 1 illustrated in FIG. 6, which was found by the inventor of the present application, will be described.

In recent years, there has been a strong demand for miniaturization and high performance of a temperature sensor, as well as other components. When temperature sensor 1 illustrated in FIG. 6 is miniaturized, thermal capacity of entire temperature sensor 1 is reduced. This improves thermal responsiveness of temperature sensor 1. On the other hand, a distance from temperature-sensitive element 3 to outside is shortened. This causes a problem in which temperature sensor 1 is easily affected by an external temperature. In particular, when case 2 is formed of a metal material, the above described problem becomes remarkable. In other words, case 2 formed of the metal material has improved thermal conductivity, resulting in good thermal conductivity from a detection target. In contrast, the problem in which temperature sensor 1 is easily affected by the external temperature conducted through bolt head part 6 located outside a detection region is caused.

Then, an object of the present invention is to improve detection responsiveness and detection accuracy of a miniaturized temperature sensor, by solving the above problem.

First Exemplary Embodiment

Hereinafter, a first exemplary embodiment of the present invention will be described with reference to the drawings.

Figure 1:
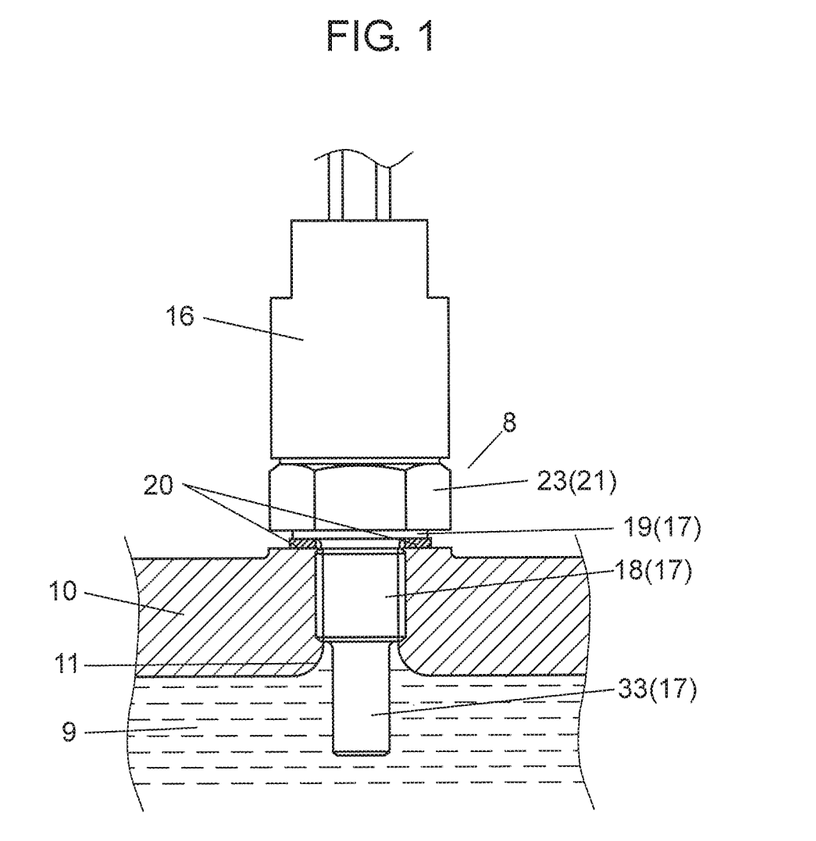
FIG. 1 illustrates a use state of a temperature sensor according to a first exemplary embodiment.
Figure 2:
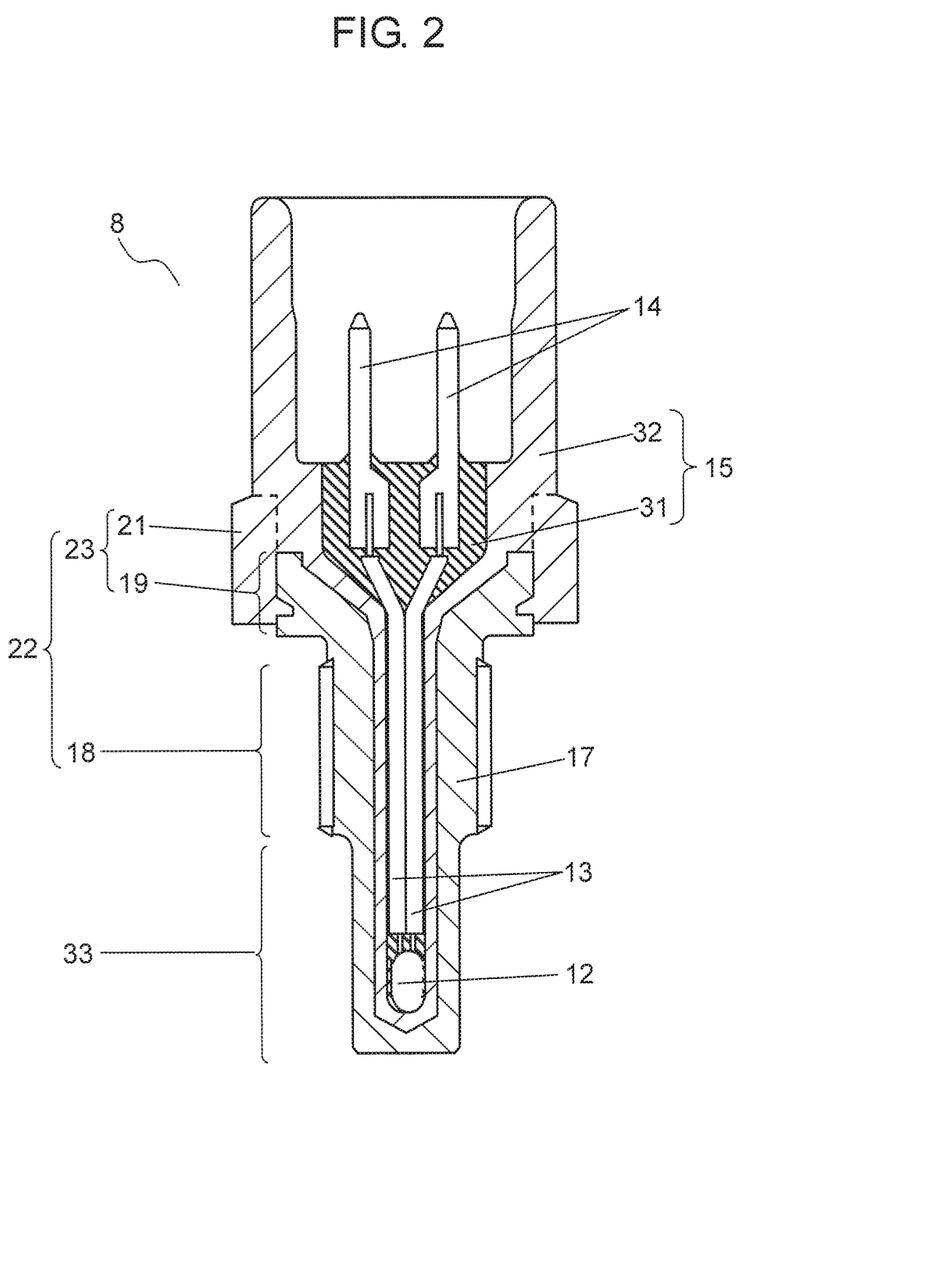
FIG. 2 is a cross-sectional view of the temperature sensor according to the first exemplary embodiment.

FIG. 1 illustrates a use state of temperature sensor 8. FIG. 2 is a cross-sectional view of temperature sensor 8. It is noted that, in FIGS. 1 and 2, identical elements are denoted by the same reference numerals and the description thereof may be omitted as appropriate.

As illustrated in FIG. 1, temperature sensor 8 is mounted into screw hole 11 provided in engine block wall 10 forming a container to be detected, in order to measure a temperature of engine oil 9. An insertion part of temperature sensor 8 (lower part 33 of metal case 17) protrudes downward from engine block wall 10, and lower part 33 is immersed in engine oil 9.

Further, in metal case 17, screw part 18 is provided above lower part 33. Large diameter part 19 having a large outer circumferential diameter is further provided above screw part 18.

Here, in the present exemplary embodiment, when temperature sensor 8 is screwed into screw hole 11, a lower surface of large diameter part 19 abuts on engine block wall 10 via metal washer 20.

Subsequently, with reference to FIG. 2, a configuration of temperature sensor 8 will be described in detail. Lower part 33 of metal case 17 is immersed in an object to be detected (for example, engine oil 9 in FIG. 1), and temperature-sensitive element 12 is disposed inside lower part 33. Temperature-sensitive element 12 detects a temperature of the object to be detected (for example, oil temperature in FIG. 1), and a detection result is led out to outside through lead wires 13 and terminals 14 as a detected signal.

Metal case 17 is formed in a bottomed cylindrical shape having opening part 24 (refer to FIG. 3A), and temperature-sensitive element 12 is disposed inside opening part 24. Further, opening part 24 of metal case 17 is sealed with second resin layer 32, and further temperature-sensitive element 12, lead wires 13, and respective parts of terminals 14 are hermetically sealed with first resin layer 31. Then, terminals 14 protrude from first resin layer 31. Further, first resin layer 31 and second resin layer 32 form resin coupler 15. By fitting resin coupler 15 to female connector 16 (illustrated in FIG. 1), the detected signal that is output from terminals 14 is led out to a subsequent stage.

Note that in the present exemplary embodiment, a glass-sealed thermistor element is used as an example of temperature-sensitive element 12.

Screw part 18 is provided above lower part 33 of metal case 17. Screw part 18 is engaged with screw hole 11 (illustrated in FIG. 1). Large diameter part 19 having a larger diameter than a diameter of screw part is provided above screw part 18.

Here, as illustrated in FIG. 1, the lower surface of large diameter part 19 acts as a seating surface abutting on engine block wall 10 via metal washer 20, when temperature sensor 8 is screwed into engine block wall 10.

In temperature sensor 8, third resin layer 21 is provided on an outer circumferential side surface of large diameter part 19. By providing third resin layer 21, detection responsiveness and detection accuracy of miniaturized temperature sensor 8 are improved. In temperature sensor 8, screw part 18 and large diameter part 19 of metal case 17, and third resin layer 21 form bolt part 22. In other words, large diameter part 19 and third resin layer 21 that form bolt head part 23 are disposed outside the container to be detected. When temperature sensor 8 is miniaturized, metal case 17 is also miniaturized, therefore thermal capacity is reduced. In addition, a distance between temperature-sensitive element 12 disposed inside temperature sensor 8 and large diameter part 19 is shortened, resulting in that temperature-sensitive element 12 is easily affected by an outside air temperature.

However, in temperature sensor 8 of the present exemplary embodiment, third resin layer 21 is provided on an outer circumference of large diameter part 19 configuring bolt head part 23. Therefore, a heat insulation effect of third resin layer 21 suppresses influence on temperature-sensitive element 12 caused by the outside air temperature, and then the detection accuracy as the temperature sensor can be improved. Thus, the influence of the outside air temperature can be suppressed, and further miniaturization of metal case 17 can be achieved. Hence, the thermal capacity of metal case 17 can be reduced, and followability to a change in temperature of engine oil 9 that is the detection target is improved. As a result, the detection responsiveness as temperature sensor 8 can be improved.

It is noted that, when third resin layer 21 is provided on the outer circumferential part of large diameter part 19 of metal case 17, a part of third resin layer 21 is interposed between the lower surface of large diameter part 19 and engine block wall 10 (container to be detected) by flowing into the lower surface of large diameter part 19, in a manufacturing process described later. Then third resin layer 21 causes a change in a shape associated with a change in a temperature, or a change in strength due to deterioration over time. This results in a fluctuation of tightening torque as bolt part 22. Therefore, when temperature sensor 8 is attached to engine block wall 10 (container to be detected), a structure in which third resin layer 21 is not interposed between the lower surface of large diameter part 19 and a surface of the container to be detected is preferable. In other words, in temperature sensor 8, a structure in which third resin layer 21 is not interposed between large diameter part 19 and metal washer 20 is preferable.

Similarly, when metal washer 20 is not used, a structure in which third resin layer 21 is not interposed between large diameter part 19 and engine block wall 10 is preferable.

To obtain a structure in which third resin layer 21 does not flow into the lower surface of large diameter part 19, a lower surface of third resin layer 21 is preferably located above the lower surface of large diameter part 19.

Further, when third resin layer 21 and resin coupler 15 are formed of a same material, third resin layer 21 and resin coupler 15 can be integrally formed. This simplifies a manufacturing method of temperature sensor 8.

[Manufacturing Method of Temperature Sensor]

Next, with reference to FIGS. 3A to 3D, the manufacturing method of temperature sensor 8 will be described.

Figure 3A:
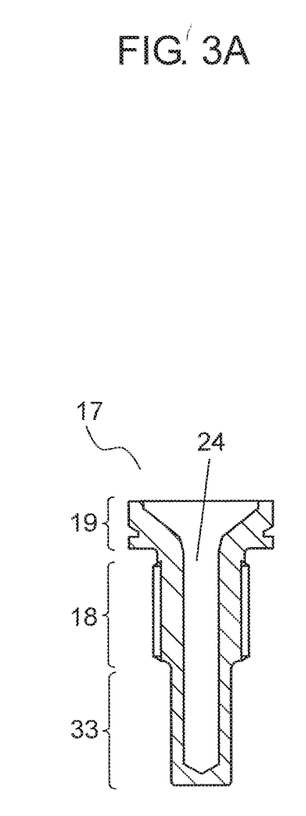
FIG. 3A is a schematic diagram illustrating a manufacturing method of the temperature sensor according to the first exemplary embodiment.

First, as illustrated in FIG. 3A, metal case 17 is processed into a bottomed cylindrical shape having opening part 24 by a cutting process.

Figure 3B:
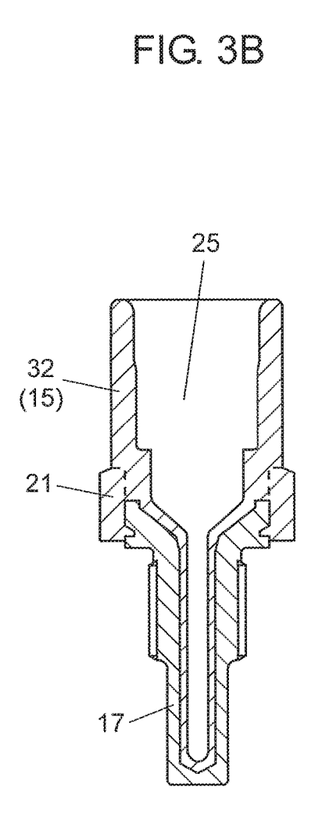
FIG. 3B is a schematic diagram illustrating the manufacturing method of the temperature sensor according to the first exemplary embodiment.

Next, as illustrated in FIG. 3B, second resin layer 32 (resin coupler 15) is molded so as to seal opening part 24. Here, second resin layer 32 (resin coupler 15) formed by molding also forms a wall part that is to be a connecting part with female connector 16 while surrounding protruded portions of terminals 14. When second resin layer 32 is formed, third resin layer 21 is simultaneously formed on the outer circumference of large diameter part 19. Second resin layer 32 is formed on an inner circumferential surface of opening part 24 of metal case 17 to form coupler opening part 25.

Figure 3C:
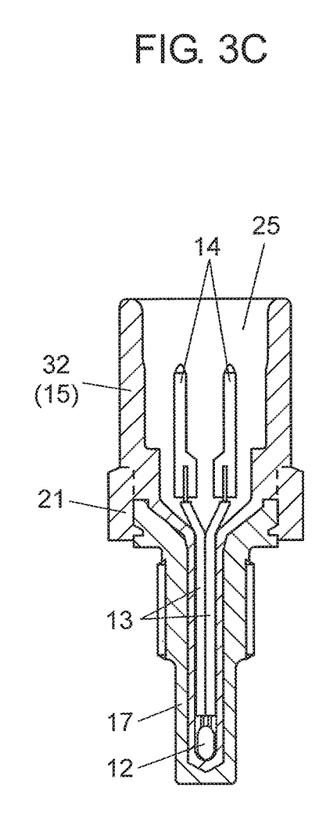
FIG. 3C is a schematic diagram illustrating the manufacturing method of the temperature sensor according to the first exemplary embodiment.
Figure 3D:
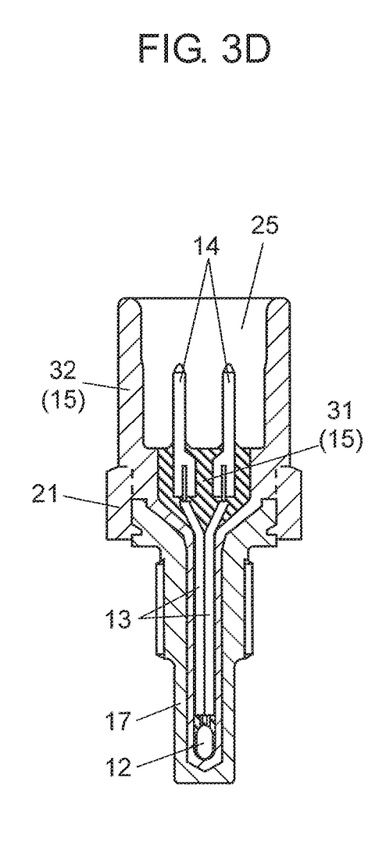
FIG. 3D is a schematic diagram illustrating the manufacturing method of the temperature sensor according to the first exemplary embodiment.

Further, as illustrated in FIG. 3C, temperature-sensitive element 12 connected to terminals 14 through lead wires 13 is inserted into coupler opening part 25. Then, as illustrated in FIG. 3D, resin is filled in coupler opening part 25, and further temperature-sensitive element 12, lead wires 13, and the respective parts of terminals 14 are hermetically sealed with first resin layer 31.

In temperature sensor 8 formed by the above described manufacturing method, third resin layer 21 disposed on the outer circumferential side surface of large diameter part 19 is easily formed by being integrally formed when resin coupler 15 is formed. In other words, third resin layer 21 is formed as a part of resin coupler 15.

With respect to resin coupler 15, fitting property with female connector 16 is important. Polybutylene terephthalate (PBT) is generally used as a material of female connector 16 to be fitted to temperature sensor 8. Further, polyphthalamide (PPA) is used as a material of resin coupler 15 (and third resin layer 21). PPA having lower thermal conductivity than that of brass which forms metal case 17 can suppress the influence of the external temperature environment. In other words, by combining a material having lower thermal conductivity, a material having higher humidity resistance, and the like, characteristics of temperature sensor 8 can be improved.

Accordingly, even when the temperature sensor is miniaturized, the detection responsiveness and the detection accuracy of the temperature sensor can be improved.

Second Exemplary Embodiment

Figure 4:
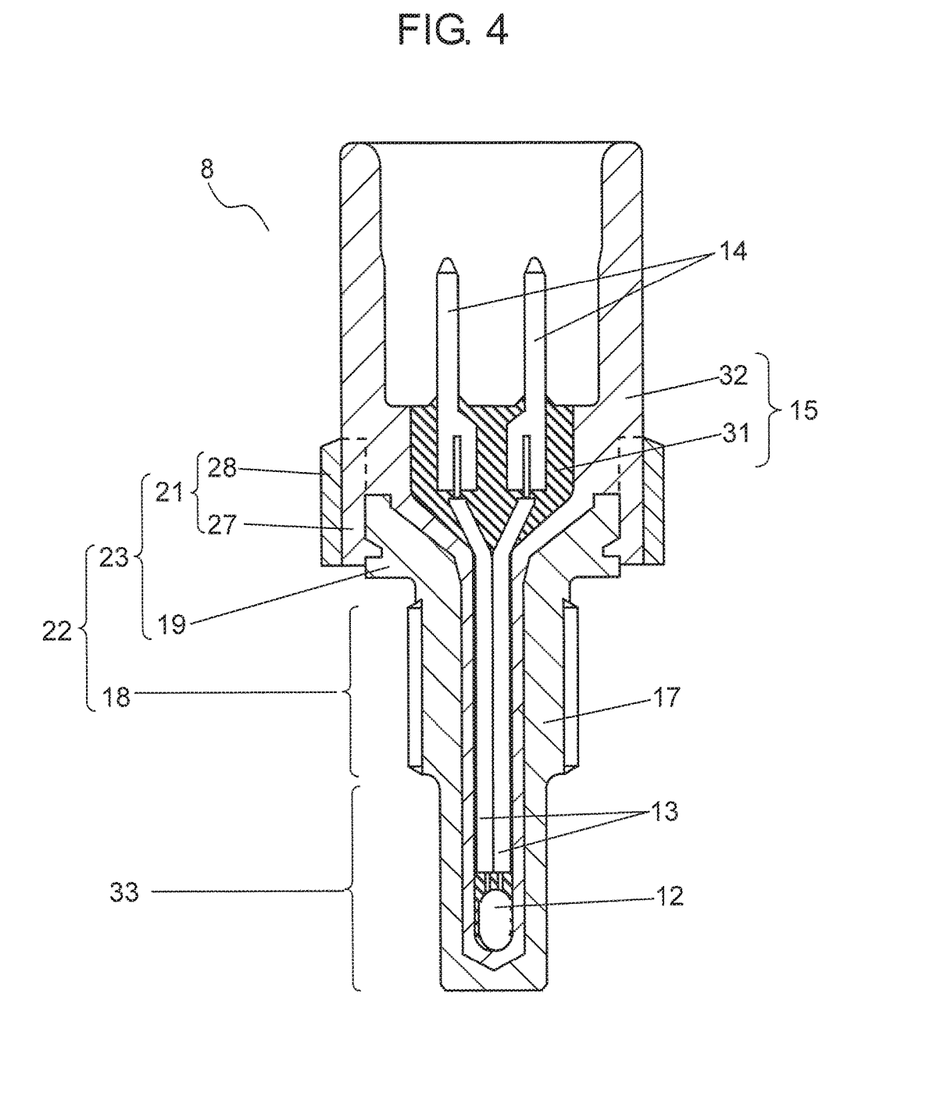
FIG. 4 is a cross-sectional view of a temperature sensor according to a second exemplary embodiment.

Next, with reference to FIG. 4, a second exemplary embodiment of the temperature sensor of the present invention will be described. It is noted that, temperature sensor 8 illustrated in FIG. 4 differs from temperature sensor 8 illustrated in FIG. 1 only in that third resin layer 21 is formed of two different kinds of materials. Elements identical to those in FIG. 1 are denoted by the same reference numerals and the description thereof will be omitted.

As described above, third resin layer 21 formed by combining the material having the lower thermal conductivity, the material having the higher humidity resistance, and the like can further improve the characteristics as the temperature sensor. Then, in temperature sensor 8 illustrated in FIG. 4, third resin layer 21 has a multilayer structure in a radial direction of temperature sensor 8.

Since the outer circumferential side surface of large diameter part 19 on which third resin layer 21 is provided forms bolt head part 23, the outer circumferential side surface needs to have strength against tightening torque when temperature sensor 8 is screwed. Therefore, a double-layer structure configured by first resin part 27 and second resin part 28 is employed as third resin layer 21. First resin part 27 that is an inner layer of third resin layer 21 is formed of a material considering the fitting property with female connector 16, which is the same as a material of second resin layer 32. Meanwhile, second resin part 28 that is an outer layer that is a part of third resin layer 21 forms bolt head part 23. Therefore, a material whose strength is enhanced by increasing glass frit to be contained in PPA or the like is selected as a material of second resin part 28. This configuration further improves reliability of temperature sensor 8.

In other words, in temperature sensor 8 of the present embodiment, third resin layer 21 includes first resin part 27 disposed on an inner side and second resin part 28 disposed on an outer side, in a radial direction of temperature sensor 8. Furthermore, strength of second resin part 28 is higher than strength of first resin part 27.

[Variation of Metal Case 17]

Next, with reference to FIG. 5, a variation of metal case 17 will be described.

As described above, the tightening torque is applied to a boundary surface between third resin layer 21 and large diameter part 19. Then, as illustrated in FIG. 5, knurls 29 that are vertical stripes or twilled lines are preferably provided on an outer circumferential surface of large diameter part 19, as a slip stopper in a direction of the tightening torque at an interface between third resin layer 21 and large diameter part 19.

In addition to knurls 29, cutout parts 30 are provided in large diameter part 19 from an outer circumference to an inner circumference of large diameter part 19. Then resin enters cutout parts 30 when resin coupler 15 for metal case 17 is formed. This further improves the above described slip stopping effect.

Figure 5:
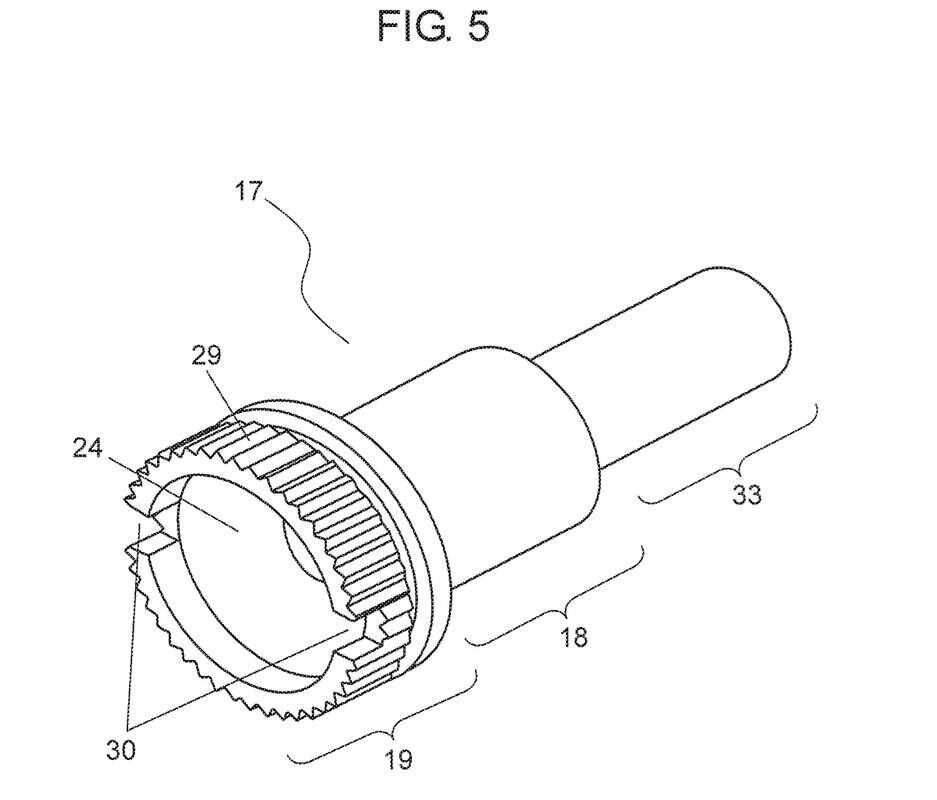
FIG. 5 is a perspective view of another metal case configuring the temperature sensor.

It is noted that, the structure of metal case 17 illustrated in FIG. 5 can be applied to any exemplary embodiment.

INDUSTRIAL APPLICABILITY

The present invention has an advantageous effect that improves detection responsiveness and detection accuracy of a temperature sensor. In particular, the present invention is effective for a vehicle mounted temperature sensor that requires miniaturization and weight-reduction.

REFERENCE MARKS IN THE DRAWINGS

8 temperature sensor
9 engine oil
10 engine block wall (container to be detected)
11 screw hole
12 temperature-sensitive element
13 lead wire
14 terminal
15 resin coupler
16 female connector
17 metal case
18 screw part
19 large diameter part
20 metal washer
21 third resin layer
22 bolt part
23 bolt head part
24 opening part
25 coupler opening part
27 first resin part
28 second resin part
29 knurls
30 cutout part
31 first resin layer
32 second resin layer
33 lower part

The invention claimed is:

1. A temperature sensor that is inserted into a screw hole of a container to be detected, the temperature sensor comprising:
a metal case that is formed in a bottomed cylindrical shape having an opening part;
a temperature-sensitive element disposed inside the opening part;
a terminal whose lower end is connected to the temperature-sensitive element; and
a resin coupler that seals the opening part, wherein:
an upper end of the terminal is led out from the resin coupler,
the metal case includes
a lower part disposed with the temperature-sensitive element,
a screw part that is provided above the lower part and is engaged with the screw hole, and
a large diameter part that is provided above the screw part and has a larger diameter than a diameter of the screw part,
an outer circumference of the large diameter part is covered with a resin layer, and
a lower surface of the resin layer is located above a lower surface of the large diameter part.

2. The temperature sensor according to claim 1, wherein the resin layer and the resin coupler are formed of a same material.

3. The temperature sensor according to claim 1, wherein the resin layer includes a first resin part disposed on an inner side in a radial direction of the temperature sensor, and a second resin part disposed on an outer side in the radial direction of the temperature sensor.

4. The temperature sensor according to claim 3, wherein strength of the second resin part is higher than strength of the first resin part.

5. The temperature sensor according to claim 1, wherein knurls are provided on an outer circumferential surface of the large diameter part to be brought into contact with the resin layer.

6. The temperature sensor according to claim 5, wherein a cutout part is provided in the large diameter part from an outer circumference to an inner circumference of the large diameter part.

7. A temperature sensor that is inserted into a screw hole of a container to be detected, the temperature sensor comprising:
 a metal case that is formed in a bottomed cylindrical shape having an opening part;
 a temperature-sensitive element disposed inside the opening part;
 a terminal whose lower end is connected to the temperature-sensitive element; and
 a resin coupler that seals the opening part, wherein:
 an upper end of the terminal is led out from the resin coupler,
 the metal case includes
  a lower part disposed with the temperature-sensitive element,
  a screw part that is provided above the lower part and is engaged with the screw hole, and
  a large diameter part that is provided above the screw part and has a larger diameter than a diameter of the screw part,
 an outer circumference of the large diameter part is covered with a resin layer, and
 the resin layer includes a first resin part disposed on an inner side in a radial direction of the temperature sensor, and a second resin part disposed on an outer side in the radial direction of the temperature sensor.

8. The temperature sensor according to claim 7, wherein strength of the second resin part is higher than strength of the first resin part.

9. The temperature sensor according to claim 7, wherein the resin layer and the resin coupler are formed of a same material.

10. The temperature sensor according to claim 7, wherein knurls are provided on an outer circumferential surface of the large diameter part to be brought into contact with the resin layer.

11. The temperature sensor according to claim 10, wherein a cutout part is provided in the large diameter part from an outer circumference to an inner circumference of the large diameter part.

* * * * *